United States Patent Office 3,327,547
Patented June 27, 1967

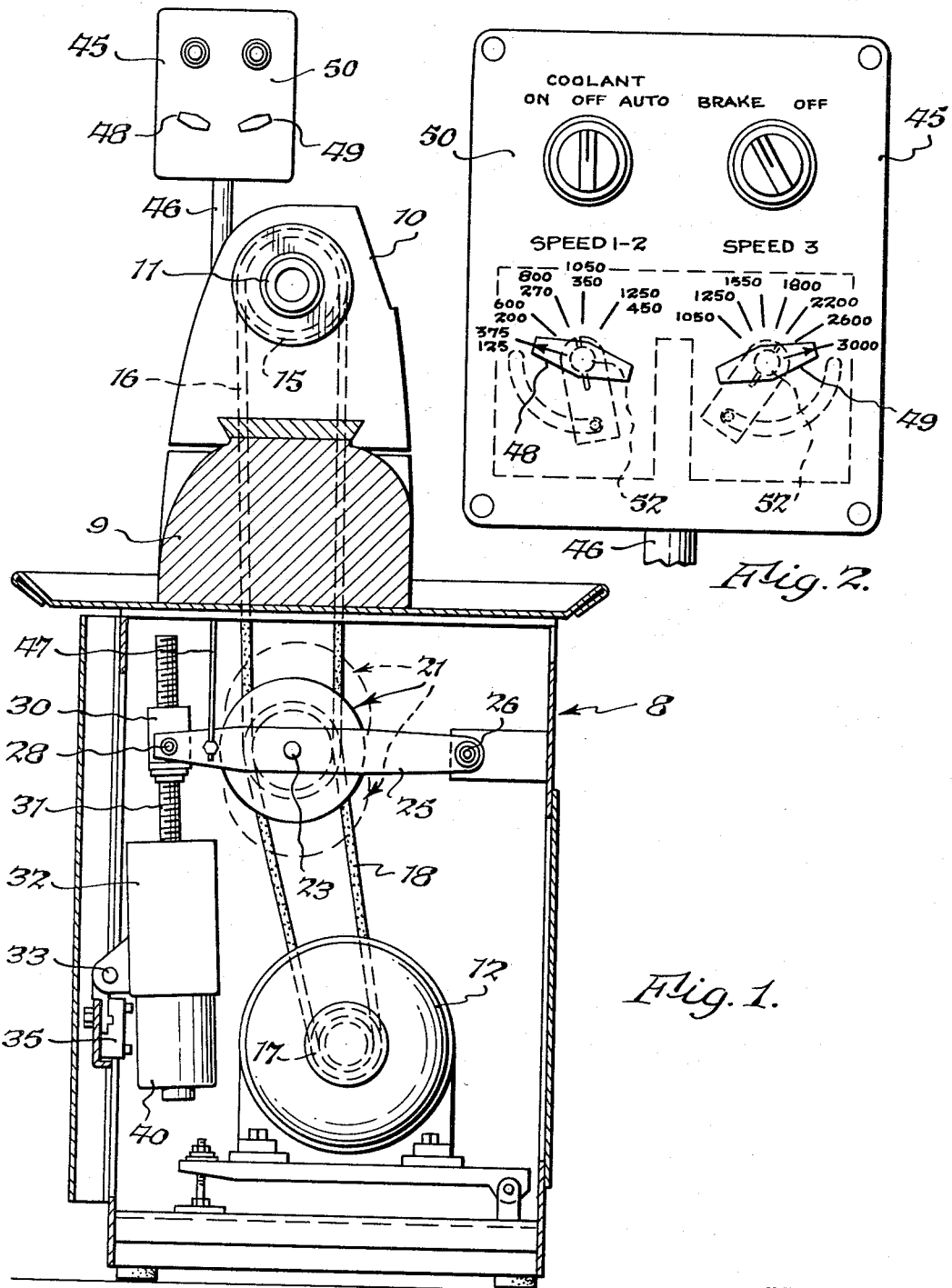

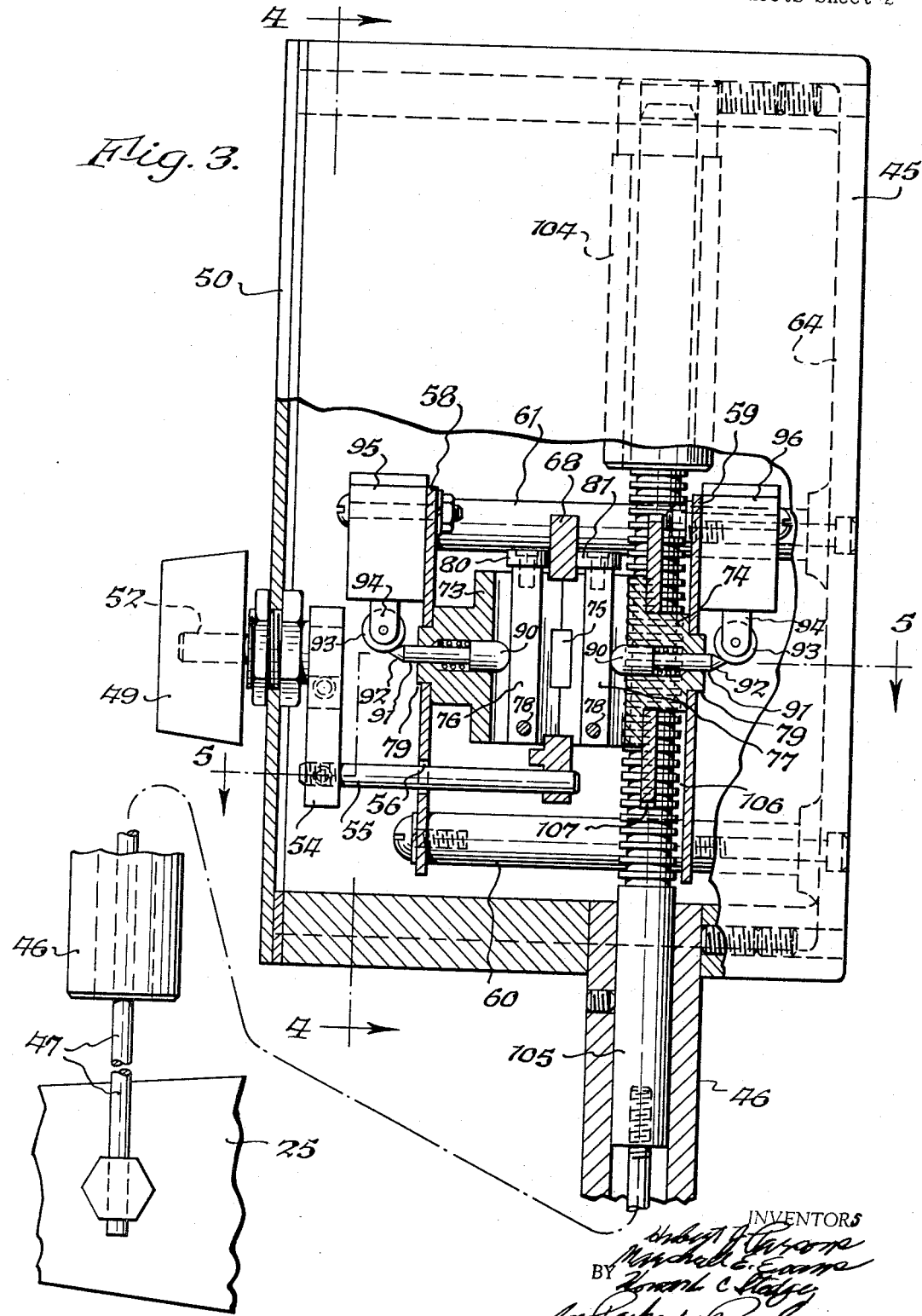

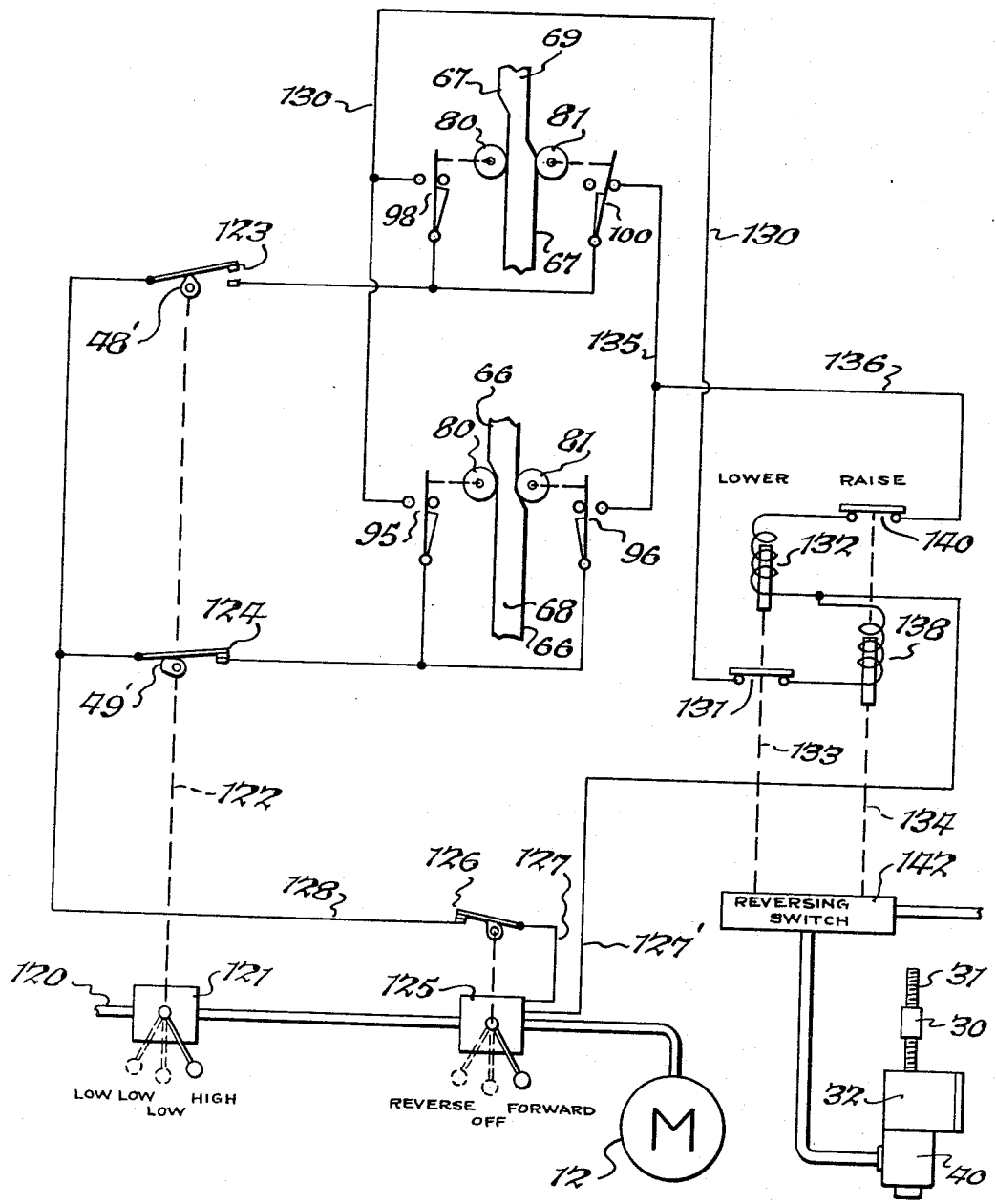

3,327,547
SELECTIVE POSITION CONTROLLER
Hubert J. Parsons, Horseheads, N.Y., Marshall E. Evans, Millerton, Pa., and Howard C. Stedge, Pine City, N.Y., assignors to Hardinge Brothers, Inc., Elmira, N.Y.
Filed Apr. 8, 1965, Ser. No. 446,613
12 Claims. (Cl. 74—335)

ABSTRACT OF THE DISCLOSURE

This invention relates to improvements in position controllers such as for example may be used in connection with variable speed V-belt drives of the general type disclosed in Evans Patent No. 2,695,529 of Nov. 30, 1954 and which is operated partly mechanically and partly electrically to provide an improved and simplified position controller which can be used to provide an infinite number of speeds.

One object of this invention is to provide a controller of this type in which the varying of the speed is effected electrically and the adjusting of the controller to vary the speed of the operation of the machine is accomplished mechanically.

In the accompanying drawings:

FIG. 1 is a fragmentary elevation, partly in section, of a machine having a selective position controller embodying this invention mounted thereon.

FIG. 2 is a face view of the front panel of the housing for the adjusting mechanism.

FIG. 3 is a sectional elevation thereof on an enlarged scale taken on the line 3—3, FIG. 4.

FIG. 8 is a diagrammatic view showing the electrical connections between the various parts of the mechanism.

Figure 4:
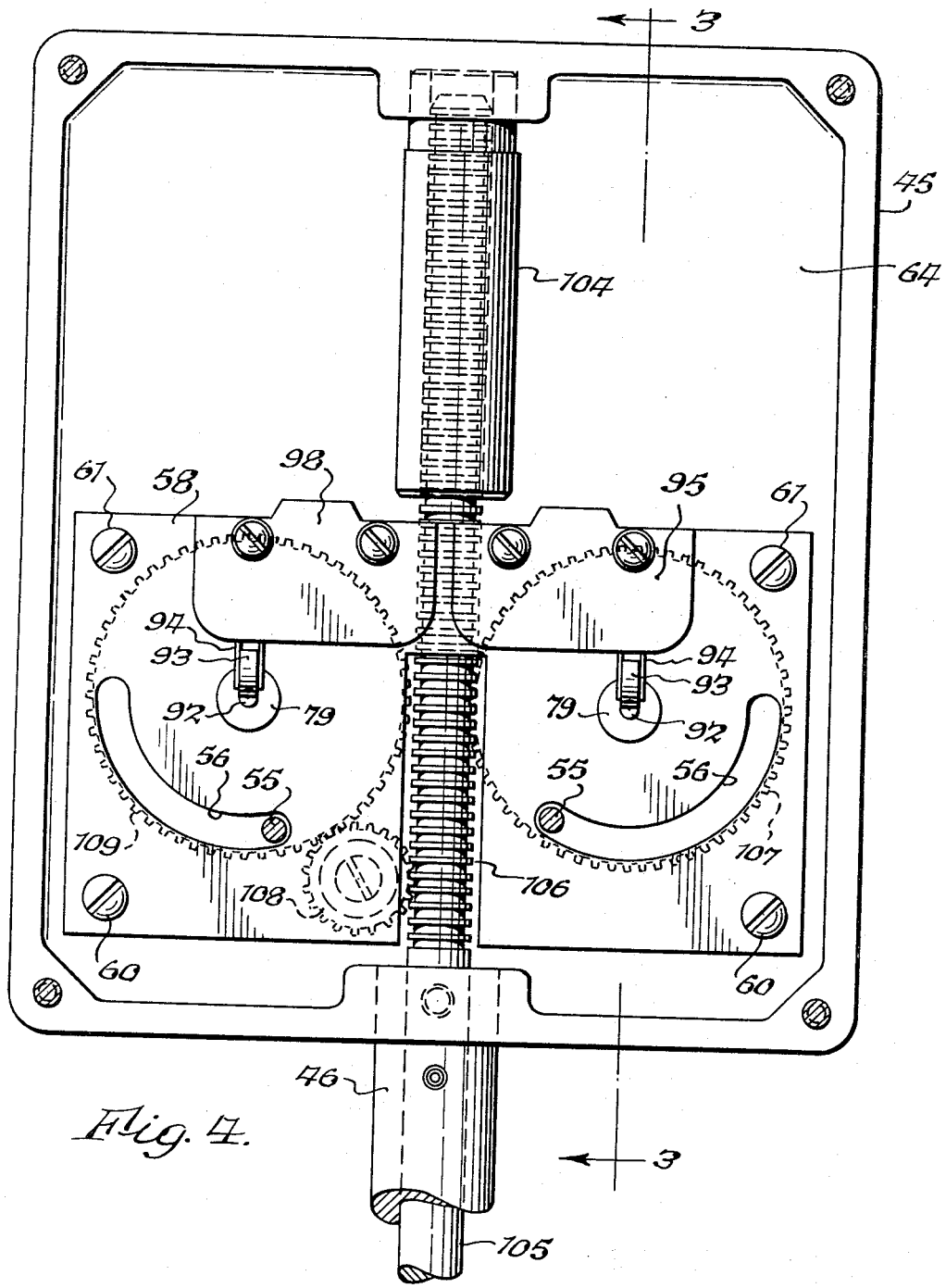
FIG. 4 is a sectional elevation thereof on line 4—4, FIG. 3.

Our improved speed control mechanism is shown in the accompanying drawings as applied to a lathe but it will be understood that this speed control mechanism may be employed in connection with any other variable speed machine or apparatus. The lathe shown by way of example in the drawings includes a pedestal 8 on which one end of the bed 9 of the lathe is supported, and 10 represents the headstock of the lathe having the usual spindle 11. This spindle is driven through V-belts by a motor 12, which in the construction illustrated is a reversible, two-speed electric motor. Within the headstock and secured on the spindle is provided the usual driven pulley 15 driven by a V-belt 16. The motor shown has a pulley 17 mounted thereon which cooperates with a V-belt 18. The V-belts 16 and 18 operate in connection with an intermediate pulley assembly which includes two fixed, outer, belt-engaging pulley members 21 rigidly mounted on a shaft 23, and a movable pulley member slidably mounted for movement lengthwise of the shaft 23 on which the outer pulley members are secured.

This drive mechanism is fully described in Evans Patent No. 2,695,529 and in Parsons et al. allowed application No. 153,038, filed Nov. 17, 1961, now Patent No. 3,-194,081.

The intermediate pulley assembly is mounted on a carrier 25 hinged at one end at 26 on a fixed bracket secured to the machine and having the intermediate pulley slidably journalled thereon. The other end of the carrier has a nut 30 pivoted at 28 which cooperates with an adjusting screw shaft 31 constituting a part of our improved position controller. By rotating the screw 31 relatively to the nut 30, the intermediate pulley assembly carrier is swung toward or from the driven pulley 15 for the purpose of varying the speed of the latter. This speed change mechanism is well known and a further detailed description of the same is believed not to be necessary.

The adjusting screw shaft 31 is journalled in a housing 32 which is pivoted at 33 on a bracket 35. The axis of the pivot 33 is substantially parallel to the hinge mounting 26 so that the adjusting screw housing 32 may swing to compensate for the arc through which the nut passes during the adjustment of the carrier 25. The adjusting screw 31 is held against movement lengthwise relatively to the housing 32 by any suitable means, not shown.

The screw shaft 31 may be turned in either direction by means of an electric motor mounted in a housing 40 secured to the housing 32, and an electrically operated friction brake of any usual or suitable construction is mounted as usual on the motor shaft. The brake is provided for stopping the rotation of the adjusting screw 31 immediately upon interruption of the electric current to the motor. Since brakes of this kind are available on the open market, further description of the same is not believed necessary, and it will be understood that this brake opposes rotation of the screw whenever the supply of current to the motor 40 is interrupted, and when the current is again supplied to the motor the brake is immediately released.

In accordance with our invention a cabinet or case 45 is provided which contains the control mechanism and is mounted by means of a tube 46 on the headstock 10 of the lathe. A rod 47 extends into this tube and the lower end of this rod is pivotally connected with the carriage 25. This cabinet 45 is provided with a front face or panel 50 on which a pair of control knobs 48 and 49 are pivoted and by means of which the speeds at which a machine is to be operated can be selected. The cabinet is also preferably provided on the front face thereof, as shown in FIG. 2, with numerals or other indices which indicate the speed which may be attained by turning the control knobs to point to the selected numeral. These knobs are rotatably mounted on the front panel 50 of the case in any suitable manner, for example, by means of shafts or pins 52 which extend through this panel and have arms 54 secured thereto within the case 45.

The mechanisms actuated by the two control knobs 48 and 49 are very similar except in details and consequently only the mechanism actuated by knob 49 will be described, but reference characters to parts common to both mechanisms will be applied to both.

Within the cabinet 45 is arranged an inner housing or frame which includes a front wall 58 and a rear wall 59, the two walls being connected by means of suitable supporting means, such as bolts 60 and 61, which are rigidly secured to the two walls 58 and 59 of the frame and to the rear wall 64 of the case or housing 45.

The outer ends of the arms 54 have attached thereto pins 55 which extend through slots or recesses 56 formed in the front wall 58 of the inner frame.

We have provided a pair of cams 66 and 67 which are mounted or formed integral with cam disks 68 and 69, and it will be noted that these cams extend to opposite sides of the cam disks and terminate in sloping or bevelled end portions 70. These bevelled portions on opposite sides of the cam disks are spaced apart circumferentially so that between these bevelled portions there are parts of the cam disks 68 and 69 which have no cams extending outwardly from the opposite sides thereof.

The cam disks are suitably journalled in circular recesses formed in two rotatable bearing members 73 and 74 rotatably mounted on the walls 58 and 59. These two bearing members are held in correct relation to each other by means of a key or dowel 75 which positions the axes of the bearing members relatively to the other. The two parts of the bearing members are secured together by means of bolts 75′ and the ends of these members are provided with trunnions 79 which are pivoted on the walls 58 and 59. Within these bearing members are mounted arms 76 and 77, each of which is pivoted at one end thereof at 78 on a part of the bearing member. These arms may swing about these pivots and are provided at their other ends with rollers 80 and 81 which bear against a cam or the cam disk 68. As one of the control knobs 48 or 49 is turned, its cam and cam ring will be correspondingly turned relatively to the bearing members, and if during this turning a roller 80 or 81 rides up the inclined end of a cam and onto a cam, the arm 76 or 77 will be swung about its pivot.

The two halves 73 and 74 of the bearing members are provided with spring pressed knobs 90 axially arranged therein and having stems 91 extending through the trunnions 79. These stems have tapered ends 92 which are positioned to engage rollers 93 mounted on the ends of arms 94 of either of two microswitches 95 and 96. If the cam actuates the roller 80, its arm 76 will be swung to the left in FIG. 3, thus actuating the microswitch 95. If the cam actuates the other roller 81, its arm 77 will be swung to the right in FIG. 3, thus actuating the other microswitch 96.

These microswitches, as will be hereinafter fully explained, will close circuits leading to the speed control motor in the housing 40 for adjusting the carrier 25 about its pivot 26. The control knob 49 actuates mechanism for operating the spindle 11 at relatively high speeds through a cam disk 68, as shown in FIG. 3, and the other control knob 48 actuates similar mechanism cooperating with a similar cam and controlling the closing of a circuit through the other microswitches 98 and 100 for relatively low speeds.

Figure 5:
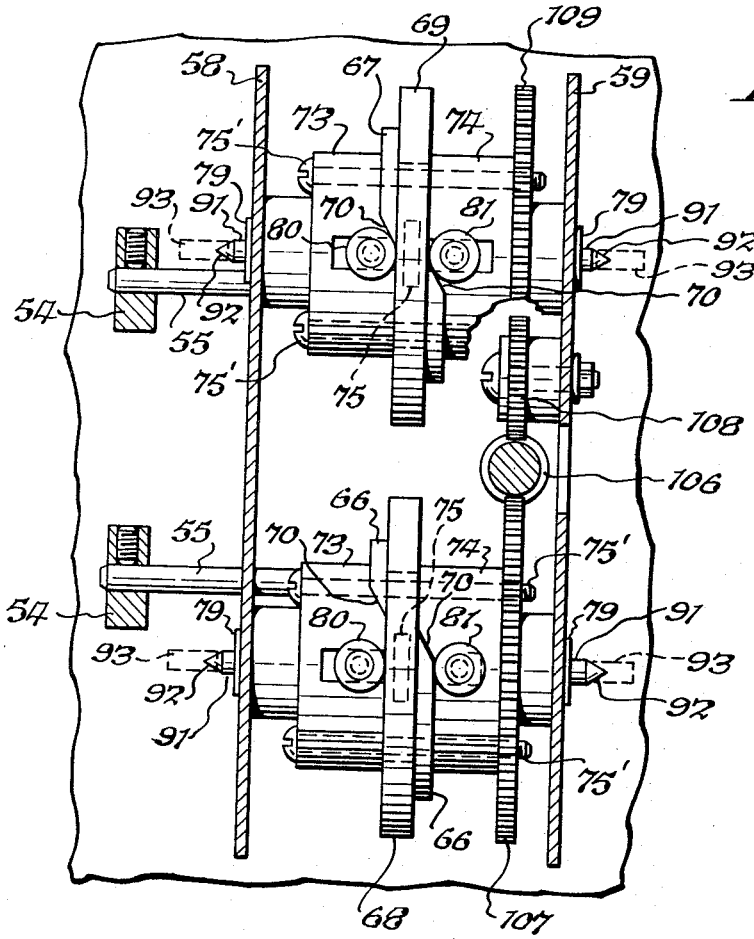
FIG. 5 is a transverse sectional plan view thereof on line 5—5, FIG. 3.
Figure 7:
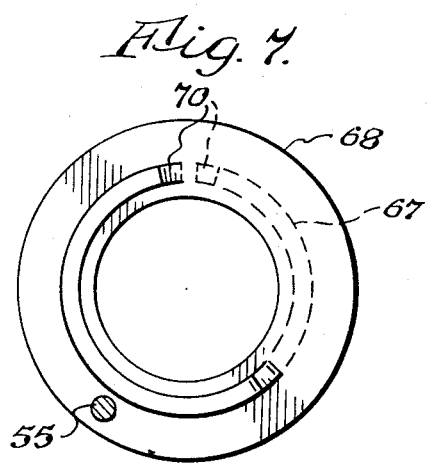
FIGS. 6 and 7 are side elevations of the adjustable cams.
Figure 6:
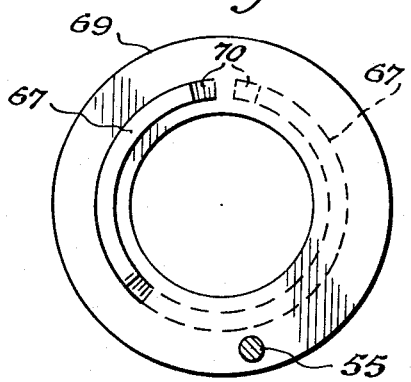

It will be noted in FIG. 5 that in the upper portion of this figure the two rollers 80 and 81, which are both located at the ends of their cams and in engagement with the cam ring, are consequently in positions in which their microswitch actuating stems 91 are withdrawn by their springs so that neither of their contact switches is actuated. In the lower part of FIG. 5 it will be noted that the roller 81 has been moved to the right by its cam and consequently its stem 91 extends outwardly far enough so that the switch 96 will be closed.

As will be hereinafter more fully explained, each of the knobs 48 and 49 controls its own electrical circuit and only one of the two cam controlled mechanisms will be actuated at a time. For either knob each of the two switches 95 (98) and 96 (100) of the cam controlled mechanism closes a circuit to the speed adjusting motor within the housing 40, one of these switches causing the motor to move the carrier 25 in a direction to increase the speed of the machine which is being controlled and the other switch causing this motor to move in the opposite direction. When the switches are both in open circuit positions, the motor is stopped and a brake is automatically applied, so that the speed at which the apparatus is to be operated will not vary until another adjustment is made.

After the speed adjusting mechanism is set by the turning of either knob 48 or 49 to a position corresponding to the speed desired, the speed adjusting motor operates to move the carrier 25 to a position corresponding to such speed, and means are provided to stop the carrier in that position. In the construction shown for this purpose, the rod 47, which is connected at its lower end to the carriage 25, extends into the tube 46 and is secured to a rod or shaft 105 guided for movement in this tube and having annular rack teeth 106 formed thereon. These rack teeth mesh with a gear 107 of one of the cam controlled mechanisms and through an idler 108 the rack teeth turn another gear 109. The upper portion of the rod or shaft 105 extends into a guide tube 104 which serves to hold the rack teeth 106 in correct relation to the two gears 107 and 109. These gears are suitably secured to the bearing members formed of the two halves 73 and 74, for example, by means of the bolts 75′ so that the rotation of either of the gears 107 or 109 will produce corresponding rotation of these bearing members and the arms 76 and 77 carried thereon. When these arms are shifted into positions in which the rollers 80 and 81 ride off the ends of the cams into a dwell space between the two cams, as shown in the upper part of FIG. 5, the switches controlled thereby are moved into open circuit positions, thus stopping further movement of the carriage 25 and the parts connected therewith. Consequently, when a cam ring has been set in a certain position corresponding to the speed desired through the actuation of the knob 48, the gear 109 will turn the bearing member until the rollers ride off the ends of the cams. As soon as they occupy the position shown in the upper part of FIG. 5, the machine will consequently operate at the particular speed for which the knob 48 has been set.

During this movement of the gear 109, the other gear 107 will of course also be moved by the rack 106, but this gear controls switches 95 and 96 which are disconnected from the circuit, as will be hereinafter explained, so that the position of the gear 107 and the manner in which it has positioned its cam will have no effect on the speed changing motor. Similarly, if the knob 49 is actuated to position the cam controlled thereby, then only the gear 107 will actuate its cam and be effective to control the speed changing motor while the cam actuated by the gear 109 will have no effect on the speed changing motor.

Each of the cams as shown has one dwell space. The slots 56 of the frame member 58 restrict the angular movement of the cam disks within the range of this device.

The invention thus far described is comprised of the mechanical components with the motor drives that would normally be required in using the invention on a lathe to coordinate and make operative these mechanical components, to cause the desired varied speed changes to take place; a circuit diagram is illustrated in FIG. 8.

In it the main drive motor 12 is shown connected to a cable of wires 120, this cable also having connection with a REVERSE, OFF, FORWARD switch 125 and a LOW-LOW, LOW, HIGH preselector switch 121. These control switches 121 and 125 are the equivalent of the switches 102 and 101 shown in the Parsons et al. application previously mentioned and operate in the same manner.

When the operator wants the machine spindle to operate in the SPEED 1–2 range (see FIG. 2), which is controlled by the knob 48, he must first move the preselector switch 121 lever to, let us say, the LOW-LOW position; also he must move the switch 125 lever from OFF to FORWARD position. This sets up the proper circuitry for forward rotation and LOW-LOW speed of the spindle 11.

The circuits for LOW-LOW and LOW speeds are separate from the HIGH speed circuit and are isolated one from the other to make it impossible for the machine to be in both high and low condition. This is accomplished by the switches 123 and 124 operated by cams 48′ and 49′ which are mechanically connected to the control switch 121. In other words, when the switch 121 lever is in the HIGH position, as shown in FIG. 8, the cam 48′ puts its switch 123 in open condition and the cam 49′ puts its switch 124 in closed position. The reverse will be true when switch 121 lever is in LOW position or LOW-LOW position, i.e. switch 124 will be open and switch 123 will be closed. Thus only the HIGH circuit will be energized when a high speed is selected by the knob.

The conditions shown in FIG. 8 are as follows: switch 125 is in FORWARD position, switch 121 is in HIGH position, cam 68 is in a dwell or open position for both of its switches 95 and 96, this meaning that the rest of the circuit is deenergized because the speed change motor 40 has moved the speed change pulleys to the position corresponding to the speed set by the knob 49.

If the knob 49 is set to a higher speed the left side cam 66 of cam disk 68 will be moved down in FIG. 8 and the switch 95 will be closed and the following will take place:

Current will be provided from supply line 127 through the closed switch 126 to the line 128. This switch 126 is only open when the switch 125 lever is in the OFF position. From line 128 through closed switch 124, now closed, switch 95, line 130, closed relay contacts 131 of the lower relay 132, RAISE relay 138 and back to the other side of the line 127' completing the circuit and energizing the relay coil 138. Energization of relay 138 opens a pair of safety contacts 140 and also mechanically through its link 134 actuates the reversing switch into such position as to energize the speed change motor 40 to rotate in the direction that will raise the carrier 25 and thereby raise the speed of the spindle to that indicated by the knob 49.

When the carrier 25 raises, it in turn lifts the rod 47, shaft 105, rack 106, rotating the gears 107 and 109 and their corresponding bearing members 73 and 74 with the arms 76 and 77 and their rollers 80 and 81. Arm 77 and its roller 81 have been all of this time riding on the cam disk 68 while arm 76 and its roller 80 have been riding on the cam 66. As the gears rotate the roller finally rides down the end portion 70 of the cam 66 into the dwell position shown in FIG. 8 and the switch 95 opens, whereupon current through the circuit is quenched and speed change motor 40 and its parts are stopped and braked.

An identical description would suffice if the LOW or LOW-LOW switch 121 position were used and we were raising the speed up to a higher value. Here then the switch 123 would be closed while switch 124 would be open and switch 98 would first be closed and then opened again by raising of the carrier 25 and the rod 47.

In lowering a speed, either of the switches 96 or 100 would be closed and current would then flow to the line 135, line 136, closed safety contacts 140, relay 132 back to the other side of the line 127', thus energizing relay 132 and opening safety contacts 131 and actuating the reversing switch 142 to make motor 40 lower the carrier 25.

Simply put, what takes place when a knob 48 or 49 is turned up or down (clockwise or counter-clockwise) is the rotation of either of the cams 66 or 67. The circuitry and mechanism then returns the condition of the cams in relation to their rollers 80 and 81, back to a dwell position, this position being the new speed the knobs 48 or 49 are set to, while at the same time the spindle is changed to that speed.

Either knob 48 or 49 can be initially set to a selected speed, within their range, and this speed instantly obtained by shifting switch 121 to either the high or low position. When switch 121 is in either low or high position, the two-speed motor 12 is connected to run in its high speed, and when in low-low position the motor runs in its low speed. Because of this, two sets of speeds are shown on the speed 1-2 dial, the lower speed being one-third of the high speed as the motor used in this example has a low speed of one-third the high speed.

It will be understood that various changes in the details, materials and arrangements of parts which have been herein described and illustrated in order to explain the nature of the invention, may be made by those skilled in the art within the principle and scope of the invention as expressed in the appended claims.

We claim:

1. A selective position controller comprising
a rotary cam movable manually into various positions, each representing a speed of operation of a machine,
a switch actuating member which is moved into switch closing position by said cam,
a switch actuated by said member,
a speed control motor supplied with current by said switch,
means actuated by said motor which moves said switch actuating member into position out of engagement with said cam,
and a speed controller carriage moved by said motor into different positions to produce different speeds.

2. A selective position controller comprising a carriage movable into different positions to control the speed of rotation of a machine,
a pair of rotary cams movable manually about an axis into various positions, each representing a speed of rotation of said machine,
a pair of switch actuating members each guided in its movement by one of said cams and also movable about said axis independently of said cams,
a reversible speed control motor connected with said carriage to shift the same,
a pair of switches actuated by said switch actuating members, one of which supplies current to said motor for turning the same in one direction and the other of which supplies current to said motor for turning the same in the opposite direction,
and means actuated by said carriage which moves said switch actuating members into positions out of engagement with said cams when said carriage has been moved into a position corresponding to the speed desired.

3. A controller according to claim 2 in which said cams have ends and in which a switch actuating member is in inoperative position when moved beyond an end of said cam.

4. A selective position controller comprising a carriage movable into different positions to control the speed of rotation of a machine,
a pair of rotary cams movable manually about an axis into various positions, each representing a speed of rotation of said machine,
a pair of switch actuating members each guided in its movement by one of said cams and also movable about said axis independently of said cams,
a pair of switches actuated by said switch actuating members,
a reversible speed control motor connected with said carriage to shift the same,
and means actuated by said carriage which move said switch actuating members relatively to said cams and out of engagement with said cams to stop further adjustment of said carriage.

5. A position controller according to claim 4 and including a cam ring having said cams mounted on opposite sides thereof,
said switch actuating members being mounted on opposite sides of said cam ring and urged into engagement with said cams.

6. A position controller according to claim 4 and including a cam ring having said cams mounted on opposite sides thereof,
said switch actuating members being mounted on opposite sides of said cam ring and urged into engagement with said cams,
a bearing member on which said cam ring is mounted to rotate about the axis of said bearing member,
and means on said bearing member for supporting said switch actuating members for movement into engagement with said cams,
said means actuated by said carriage turning said bearing member to move said switch actuating members relatively to said cams.

7. A selective speed controller comprising a bearing member rotatable about an axis and having a peripheral groove concentric with said axis, a cam ring mounted to rotate in said groove and having cams on the opposite sides thereof,
switch actuating members each pivoted at one end on said bearing member and having the other ends engaging said cams, means for adjusting said cam ring into positions corresponding to the speeds desired,
switches moved into closed position by said switch actuating members when engaging said cams,
and means for rotating said bearing member about its axis to move the same into a position in which said switch actuating members disengage said cams when the desired speed has been attained.

8. A selective speed controlling mechanism comprising a carriage movable into different positions to produce different speeds of a driven member,
a bearing member rotatable about an axis and having a peripheral groove concentric with said axis,
a cam ring mounted to rotate in said groove and having cams on the opposite sides thereof,
switch actuating members each pivoted at one end on said bearing member and having the other ends engaging said cams,
means for adjusting said cam ring into positions corresponding to the speeds desired,
switches moved into closed position by said switch actuating members when engaging said cams,
means actuated by said switches to move said carriage in opposite directions,
and a connection between said carriage and said bearing member to rotate said bearing member about its axis to move said switch actuating members to the ends of said cams out of engagement therewith for stopping movement of said carriage.

9. A speed controller according to claim 8 in which the connection between said carriage and said bearing member for rotating said bearing member when said carriage is moved includes
a rod connected with said carriage and with a rack,
and a gear rotated by said rack which rotates said bearing member.

10. A selective speed controlling mechanism including a carriage connected with a driven member to impart different speeds thereto,
a pair of knobs adjustable in accordance with the speeds desired, one of said knobs being adjustable to obtain low speeds and the other knob being adjustable for higher speeds,
an arm mounted on each knob,
a pair of cam members controlled by each knob in accordance with the speed desired,
a switch actuating member for each cam,
bearing members on which said cam members and said switch actuating members are mounted, said cam members being adjustable on said bearing members independently of said switch actuating members,
means controlled by said carriage to move both sets of switch actuating members into positions beyond the ends of said cams,
switches closed by said switch actuating members when in engagement with said cams, motors controlled by said switches to impart movement to said carriage, and opened when said switch actuating members are beyond said cams,
electrical means controlled by said switches for imparting movement to said carriage, and
means for rendering only one of said knobs and the arms controlled thereby operative at a time.

11. A selective speed controlling mechanism according to claim 10 and including a rack bar connected with said carriage,
and gears meshing with said rack bar for turning said bearing members when said carriage is moved to move the switch actuating member relatively to said cams.

12. A selective position controller including a carriage movable into different positions to produce different speeds of rotation of a driven member,
an adjusting knob adjustable manually into different positions in accordance with the speed of rotation desired,
a pair of cams mounted on opposite sides of a cam ring and connected with said knob for movement of said cam ring and cams mounted thereon by said knob into different positions about an axis,
a bearing member rotatable about said axis independently of said cam ring,
a pair of arms pivotally mounted on said bearing member and each bearing on one of said cams and movable by said cams,
a pair of switches each operated by one of said arms,
a speed control motor operatively connected with said carriage and electrically connected with said switches and rotatable in one direction by one of said switches and in the other direction by the other switch,
said bearing member on which said arms are mounted being adjustable about said axis to carry said arms therewith,
and means connected with said carriage for rotating said bearing member to carry said arms into positions out of contact with said cam to interrupt the flow of current through said switches to said motor to stop said carriage.

References Cited
UNITED STATES PATENTS

| | | | |
|---|---|---|---|
| 2,695,529 | 11/1954 | Evans | 74—230.17 |
| 3,048,760 | 8/1962 | Hoover | 74—424.8 X |
| 3,194,081 | 7/1965 | Parsons et al. | 74—230.17 |
| 3,221,118 | 11/1965 | Hoover | 74—424.8 X |

DONLEY J. STOCKING, *Primary Examiner.*

DAVID J. WILLIAMOWSKY, *Examiner.*

L. H. GERIN, *Assistant Examiner.*